United States Patent
Frick et al.

(10) Patent No.: US 10,362,840 B1
(45) Date of Patent: Jul. 30, 2019

(54) DEPLOYABLE FLAG BRACELET

(71) Applicants: David Frick, Littleton, CO (US);
Laura Frick, Littleton, CO (US)

(72) Inventors: David Frick, Littleton, CO (US);
Laura Frick, Littleton, CO (US)

(*) Notice: Subject to any disclaimer, the term of this patent is extended or adjusted under 35 U.S.C. 154(b) by 0 days.

(21) Appl. No.: 15/902,780

(22) Filed: Feb. 22, 2018

(51) Int. Cl.
*A44C 5/00* (2006.01)

(52) U.S. Cl.
CPC .................... *A44C 5/0007* (2013.01)

(58) Field of Classification Search
CPC ............................................... A44C 5/0007
USPC ........................................ 63/1.11, 1.12, 1.14
See application file for complete search history.

(56) References Cited

U.S. PATENT DOCUMENTS

| | | | |
|---|---|---|---|
| 5,127,127 A | 7/1992 | Jarosinski | |
| 5,280,661 A | 1/1994 | Brown | |
| 5,617,584 A * | 4/1997 | Brennan | A41D 13/11 2/172 |
| 6,131,209 A | 10/2000 | Thayer et al. | |
| 6,240,565 B1 * | 6/2001 | Spear | A41D 13/08 2/158 |
| 6,881,273 B1 | 4/2005 | Oberman | |
| 7,240,391 B1 | 7/2007 | Boze et al. | |
| 2009/0235478 A1 | 9/2009 | England | |
| 2013/0219645 A1 | 8/2013 | Dowd | |
| 2014/0130234 A1 * | 5/2014 | King | B63C 9/00 2/170 |
| 2015/0105323 A1 | 4/2015 | Novak et al. | |
| 2015/0359399 A1 | 12/2015 | Zaczynski | |

FOREIGN PATENT DOCUMENTS

CN 201630269 U 11/2010

* cited by examiner

*Primary Examiner* — Abigail E Troy
(74) *Attorney, Agent, or Firm* — Williams Intellectual Property; Benjamin F. Williams

(57) ABSTRACT

A deployable flag bracelet is provided herein. The deployable flag bracelet includes a medial longitudinal flap member, a first longitudinal flap member, and a deployable flag portion. The medial longitudinal flap member includes a first longitudinal edge and an opposing longitudinal edge where the deployable flag portion is coextensive with the first longitudinal edge and the first longitudinal flap member is coextensive with the opposing longitudinal edge. The deployable flag portion is rollable for storage into contact overlying the medial longitudinal flap member and thereat concealable beneath the first longitudinal flap member. A first transverse edge and an opposing transverse edge of the medial longitudinal flap member further includes a first end flap and a second end flap, respectively, for endwise attachment therebetween to form a bracelet. The bracelet is to be worn about a user's wrist for convenient transport of the deployable flag portion for cleaning optical surfaces.

10 Claims, 5 Drawing Sheets

US 10,362,840 B1

DEPLOYABLE FLAG BRACELET

BACKGROUND OF THE INVENTION

Various types of cleaning cloths for cleaning optical surfaces (e.g., eyeglass lenses, camera lenses, phone displays) are known in the prior art. The cleaning cloths are typically made of micro-fiber and usually come with a brand new pair of glasses or smart phone. However, due to day-to-day activities, going to work, running erands, playing sports, exercising, etc. it is common for the cleaning cloths to get left behind, misplaced, or lost altogether. More often than not, a cleaning cloth is nowhere to be found when a pair of glasses gets dirty or a display is filled with smudges. The destitute individual is forced to resort to an alternative cleaning method (e.g., using one's shirt) that may inadvertently harm the optical surfaces.

Thus, there is a need in the art for a deployable flag bracelet having a deployable flag portion for cleaning optical surfaces that is conveinently transportable about a user's wrist.

FIELD OF THE INVENTION

The present invention relates to cleaning cloths, and more particularly, to a deployable flag bracelet having a deployable flag portion for cleaning optical surfaces that is conveinently transportable about a user's wrist.

SUMMARY OF THE INVENTION

The general purpose of the deployable flag bracelet, described subsequently in greater detail, is to provide a deployable flag bracelet which has many novel features that result in a deployable flag bracelet which is not anticipated, rendered obvious, suggested, or even implied by prior art, either alone or in combination thereof.

A deployable flag bracelet is described herein having a deployable flag portion coextensive along a first longitudinal edge of a medial longitudinal flap member. The flag portion is rollable for storage when not in use into contact overlying the medial longitudinal flap member and thereat concealable beneath a first longitudinal flap member disposed coextensive along an opposing longitudinal edge of the medial longitudinal flap member. The medial longitudinal flap member further having a first transverse edge and an opposing transverse edge for endwise attachment therebetween to form a bracelet. The deployable flag portion is maintainably concealed behind the first longitudinal flap member and wearable about the wrist of a user, whereby the user can conveniently deploy the flag portion to clean an optical surface by detaching the first transverse edge from the opposing transverse edge and unrolling the deployable flag portion. The deployable flag portion may be made of microfiber and include an advertisement thereon.

The deployable flag bracelet may further include a second longitudinal flap member situated between the deployable flag portion and the medial longitudinal flap member. The deployable flag portion is therefore coextensive along a second longitudinal edge of the second longitudinal flap member and the second longitudinal flap member is therefore coextensive with the first longitudinal edge of the medial longitudinal flap member. The deployable flag portion is thereat concealable beneath the first longitudinal flap member and the second longitudinal flap member.

The first transverse edge and the opposing transverse edge are endwise attached with a fastener comprising at least one of a snap fastener, an adhesive, a button fastener, or a hook and loop.

In other embodiments, the deployable flag bracelet includes a first end flap and a second end flap disposed upon the first transverse edge and the second transverse edge, respectively, wherein the first end flap and the second end flap are endwise attached with a fastener to form the bracelet. The fastener may include a first mating portion and a corresponding mating portion, wherein the first mating portion is disposed on an obverse surface of the first end flap and the corresponding mating portion is disposed on a reverse surface of the second end flap.

Thus has been broadly outlined the more important features of the present deployable flag bracelet so that the detailed description thereof that follows may be better understood and in order that the present contribution to the art may be better appreciated.

Objects of the present deployable flag bracelet, along with various novel features that characterize the invention are particularly pointed out in the claims forming a part of this disclosure. For better understanding of the deployable flag bracelet, its operating advantages and specific objects attained by its uses, refer to the accompanying drawings and description.

BRIEF DESCRIPTION OF THE DRAWINGS

In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGURES

Figure 1A:
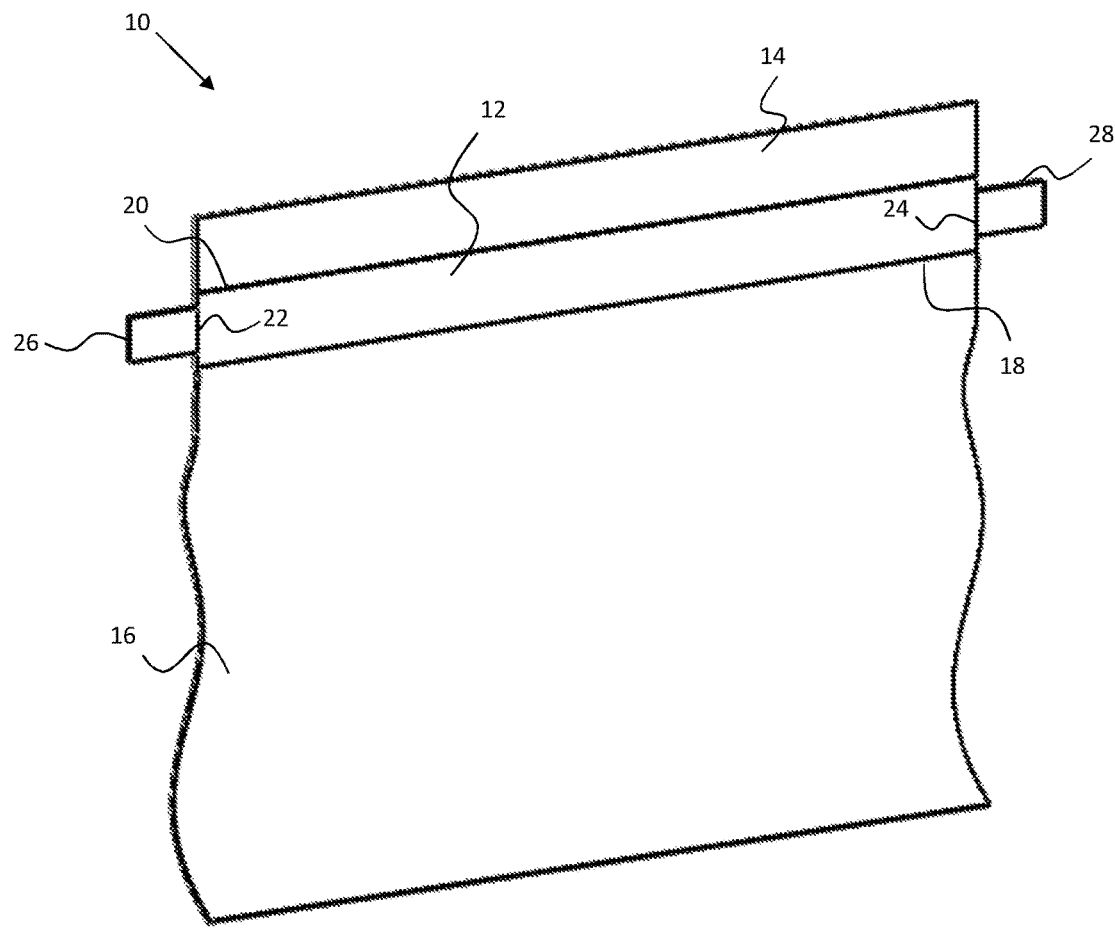

FIG. 1A is a perspective view of a first configuration of a deployable flag bracelet in accordance with embodiments of the invention.

Figure 1B:
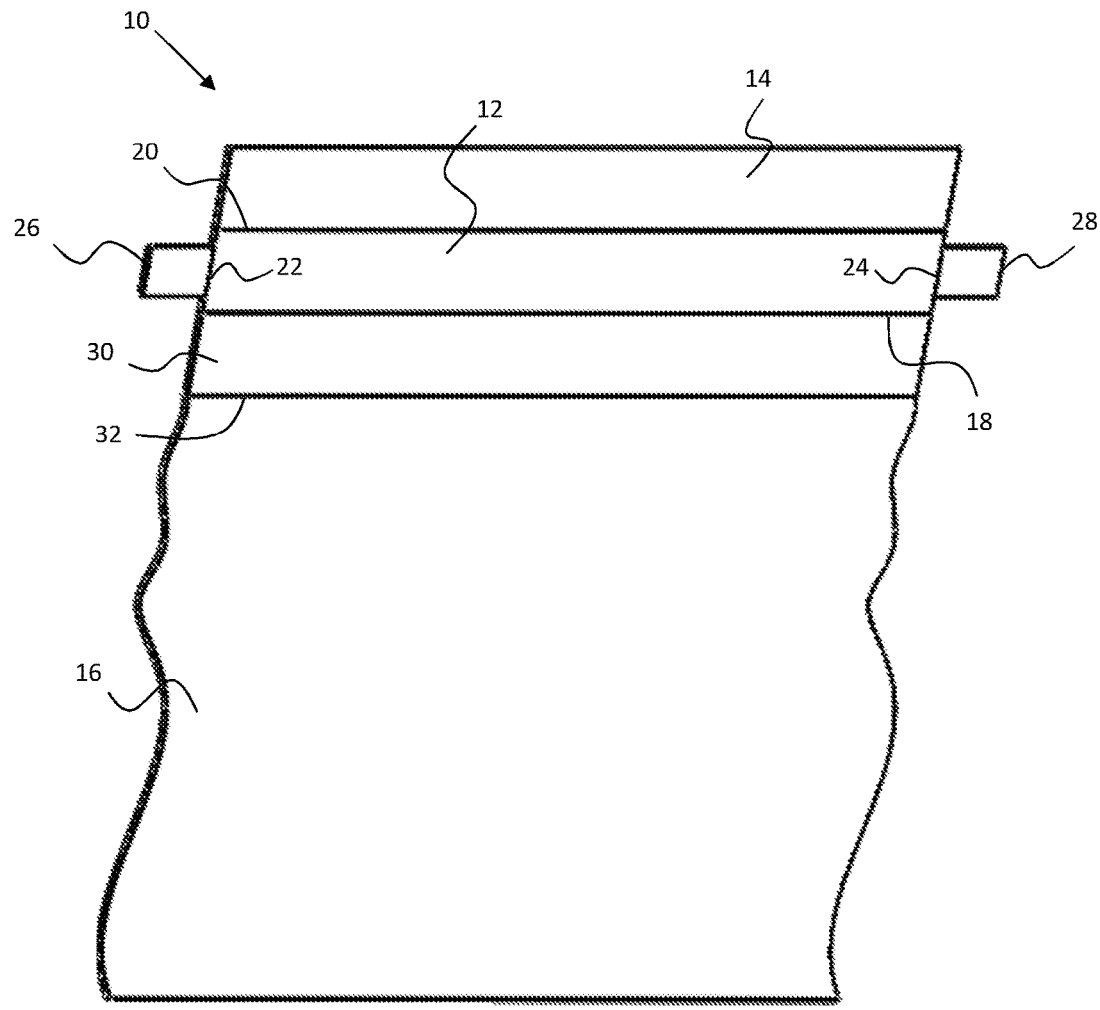

FIG. 1B is a perspective view of a second configuration of a deployable flag bracelet in accordance with embodiments of the invention.

Figure 2A:
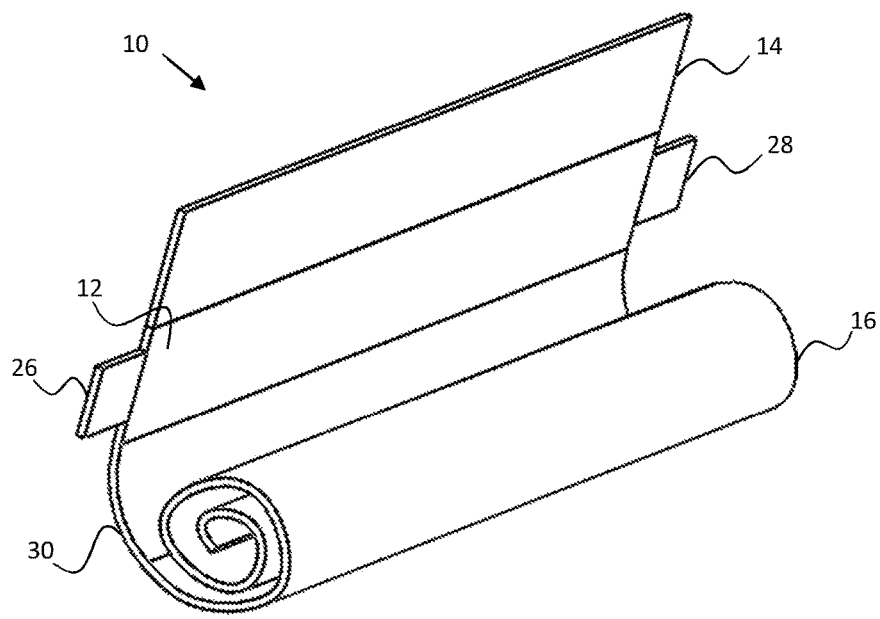
Figure 2B:
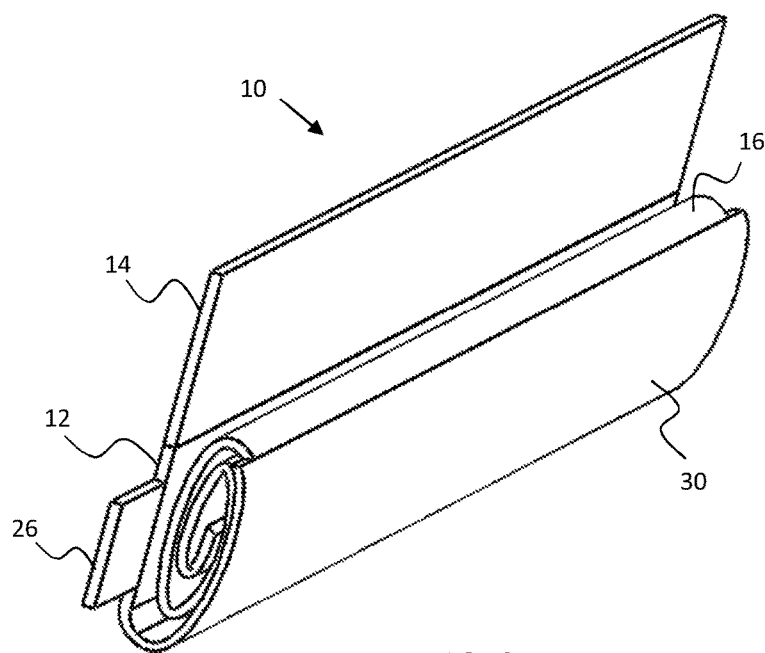
Figure 2C:
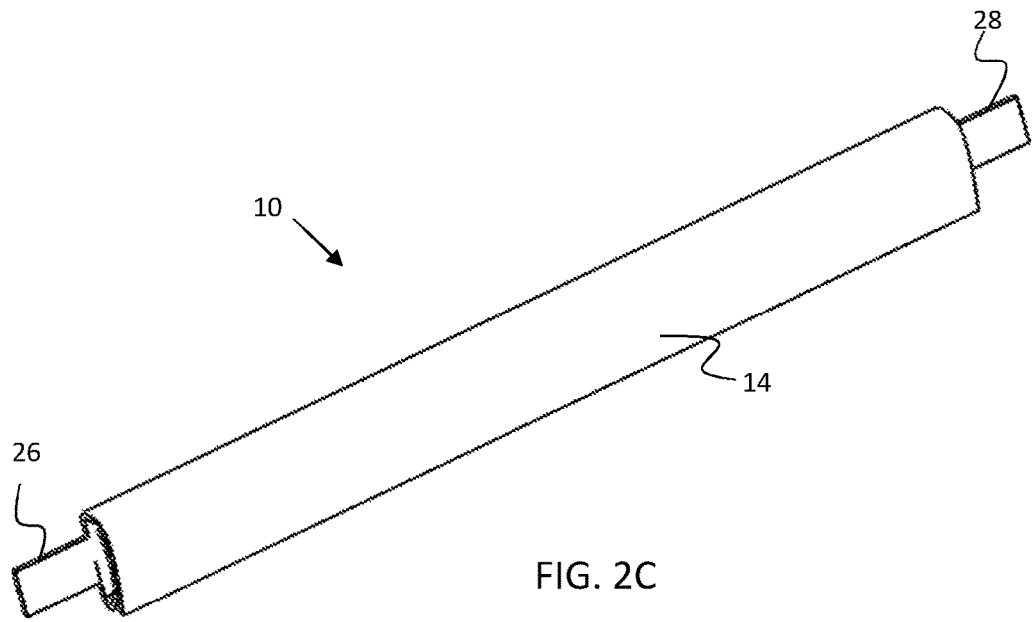
Figure 2D:
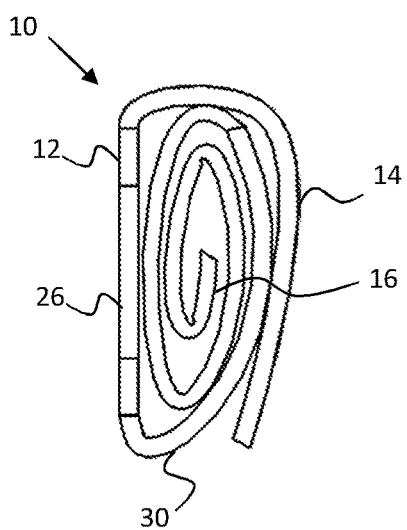

FIGS. 2A-2D depict a deployable flag portion of the deployable flag bracelet being rolled into storage to be worn about a user's wrist in accordance with embodiments of the invention, where FIG. 2A depicts a first step, FIG. 2B depicts a second step, FIG. 2C depicts the flag portion rolled into storage, and FIG. 2D depicts a side-view of the flag portion in storage as shown in FIG. 2C.

Figure 3A:
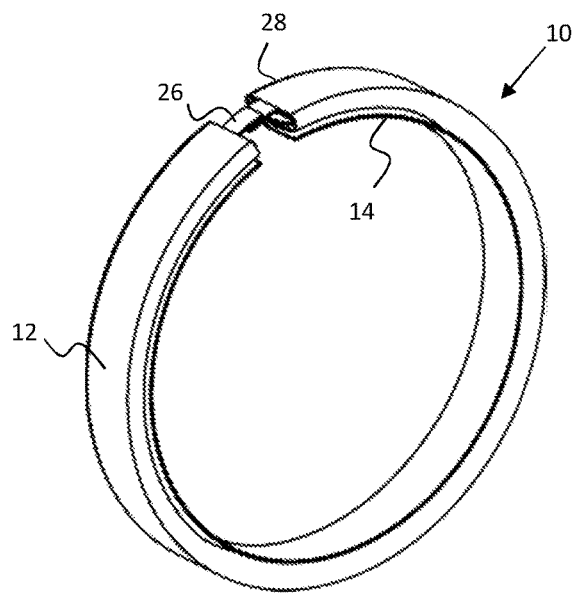

FIG. 3A depicts the deployable flag bracelet in the form of a bracelet in accordance with embodiments of the invention.

Figure 3B:
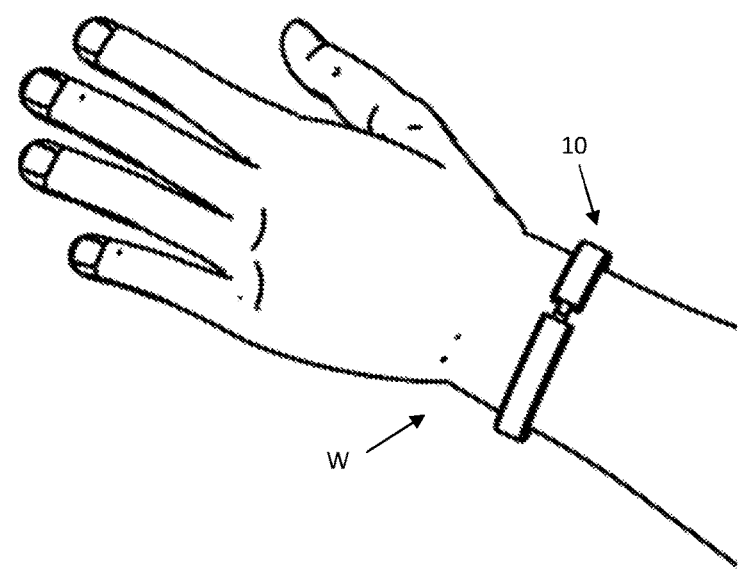

FIG. 3B depicts the deployable flag bracelet in the form of a bracelet and worn about a user's wrist in accordance with embodiments of the invention.

DETAILED DESCRIPTION OF THE DRAWINGS

The present invention has utility as a deployable flag bracelet having a deployable flag portion for cleaning optical surfaces that is conveniently transportable about a user's wrist. The following description of various embodiments of the invention is not intended to limit the invention to those specific embodiments, but rather to enable any person skilled in the art to make and use this invention through exemplary aspects thereof. It should be appreciated that although the deployable flag portion is described with reference to cleaning optical surfaces (e.g., eyeglass lenses, camera lenses, phone displays), other surfaces may likewise be cleaned with the deployable flag portion.

With reference now to the drawings, and in particular FIGS. 1 through 3B thereof, examples of the instant deployable flag bracelet employing the principles and concepts of the present deployable flag bracelet and generally designated by the reference number 10 will be described.

Referring particularly to FIG. 1A, a preferred embodiment of the present deployable flag bracelet 10 is illustrated. The deployable flag bracelet 10 includes a medial longitudinal flap member 12, a first longitudinal flap member 14, and a deployable flag portion 16. The medial longitudinal flap member 12 includes a first longitudinal edge 18 and an opposing longitudinal edge 20. The deployable flag portion 16 is coextensive along the first longitudinal edge 18 of the medial longitudinal flap member 12, and the first longitudinal flap member 14 is coextensive along the opposing longitudinal edge 20 of the medial longitudinal flap member 12. The medial longitudinal flap member 12 further includes a first transverse edge 22 and an opposing transverse edge 24 for endwise attachment therebetween to form a bracelet as further described below. The first transverse edge 22 may further include a first end flap 26 projecting longitudinally therefrom, and the opposing transverse edge 24 may likewise include a second end flap 28 projecting longitudinally therefrom. The first end flap 26 and the second end flap 28 for endwise attachment therebetween to form a bracelet.

With reference to FIG. 1B, in a particular embodiment, the deployable flag bracelet 10 further includes a second longitudinal flap member 30 situated between the medial longitudinal flap member 12 and the deployable flag portion 16. The second longitudinal flap member 30 has a second longitudinal edge 32. The second longitudinal flap member 30 is coextensive along the first longitudinal edge 18, and the flag portion 16 is coextensive along the second longitudinal edge 32 of the second longitudinal flap member 30. The second longitudinal flap member 32 is advantageous as an additional layer of concealability of the flag portion 16 as further described below. However, it should be appreciated that the second longitudinal flap portion is not necessary to the operability of the invention. Likewise, it will be apparent to one in the art, that additional longitudinal flap members may be added to the deployable flag bracelet 10, but at the expense of additional materials, increased production costs, and the overall bulkiness of the bracelet 10.

With reference to FIGS. 2A to 2D, the deployable flag bracelet 10 is shown being rolled into storage to be wearable about a user's wrist, where FIG. 2A depicts the flag portion 16 rolling into the medial longitudinal flap member 12, FIG. 2B depicts the second longitudinal flap member 30 covering the flap portion 16, FIG. 2C depicts the first longitudinal flap member 14 covering the second longitudinal flap member 20 and flag portion 16, and FIG. 2D depicts a side view of the first longitudinal flap member 14 covering the second longitudinal flap member 20 and flag portion 16 as shown in FIG. 2C. The flag portion 16 is rollable for storage when not in use to be wearable about a user's wrist. The flag portion 16 is rolled into contact overlying the medial longitudinal flap member 12 and is thereat concealable beneath the first longitudinal flap member 14 and the second longitudinal flap member 30. The second longitudinal flap member 30 folded to directly contact the flap portion 16 to cover/conceal the flag portion 16 against the medial longitudinal flap member 12. The first longitudinal flap member 14 is folded to directly contact the second longitudinal flap member 30 to cover/conceal the second longitudinal flap member 30 and the flag portion 16 against the medial longitudinal flap member 12. If the second longitudinal flap member 30 is not present as shown in FIG. 1A, then the first longitudinal flap member 14 is folded to directly contact the flag portion 16 to cover/conceal the flag portion 16 against the medial longitudinal flap member 12. More specifically, the deployable flag bracelet 10 has an obverse surface and a reverse surface, where the obverse surface is shown in FIGS. 1A-2D. The flag portion 16 is therefore rolled into contact overlying the obverse surface of the medial longitudinal flap member 12. The second longitudinal flap member 30 is then folded where the obverse surface of the second longitudinal flap member 30 directly contacts the flag portion 16 to cover/conceal the flag portion 16 against the medial longitudinal flap member 12. The first longitudinal flap member 14 is folded where the obverse surface of the first longitudinal flap member 14 directly contacts the reverse surface of the second longitudinal flap member 30 to cover/conceal the second longitudinal flap member 30 and flag portion 16 against the medial longitudinal flap member 12. If the second longitudinal flap member 30 is not present as shown in FIG. 1A, then the first longitudinal flap member 14 is folded where the obverse surface of the first longitudinal member 16 directly contacts the flag portion 16 to cover/conceal the flag portion 16 against the medial longitudinal flap member 12.

With reference to FIGS. 3A to 3B, the deployable flag bracelet 10 is shown having endwise attachment between the first transverse edge 22 and opposing transverse edge 24 to form a bracelet, where FIG. 3A depicts the deployable flag bracelet 10 in bracelet form and FIG. 3B depicts the deployable flag bracelet 10 in bracelet form worn about a user's wrist W. Once the deployable flag bracelet 10 is rolled as shown in FIG. 2C, the first transverse edge 22 and opposing transverse edge 24 are brought together and endwise attached to form a bracelet. In a particular embodiment, the first transverse edge 22 and opposing transverse edge 24 are directly endwise attached with a fastener including at least one of a snap fastener, an adhesive, a button fastener, or a hook and loop fastener (e.g., Velcro®). The fastener may include a first mating portion (e.g., hook) and a corresponding mating portion (e.g., loop), wherein the first mating portion is disposed on the obverse surface of the first transverse edge 22 and the corresponding mating portion is disposed on the reverse surface of the opposing transverse edge 24. In another embodiment, the deployable flag bracelet 10 includes the first end flap 26 and a second end flap 28, as described above, to facilitate the endwise attachment, where the first transverse edge and opposing transverse edge do not have a fastener. Rather, the first end flap 26 and second end flap 28 are endwise attached with a fastener to form a bracelet. The fastener likewise including a first mating portion (e.g., hook) and a corresponding mating portion (e.g., loop), wherein the first mating portion is disposed on the obverse surface of the first end flap 26 and the corresponding mating portion is disposed on the reverse surface of the second flap 28. Therefore, the user may form the deployable flag bracelet about their wrist for convenient transport of the deployable flag portion 16. To deploy the flag portion 12 to clean an optical surface, the user simply detaches either the first transverse edge 22 and second transverse edge 24 or the first end flap 26 and second end flap 28, if present, and un-rolls the deployable flag portion 16 from the deployable flag bracelet 10.

In specific embodiments, the deployable flag bracelet 10 is made of natural or synthetic textiles to easily manipulate the material for storage and deployment. The textile material also adds a sense of comfort when worn about a user's wrist W. In a particular embodiment, the deployable flag portion 16 is made of micro-fiber, a gold standard for cleaning optical surfaces. The medial longitudinal flap member 12, first longitudinal flap member 14, and second longitudinal flap member 30 may be made of a different, cheaper textile known in the art. Further, in some embodiments, the medial longitudinal flap member 12, the first longitudinal flap member 14, the second longitudinal flap member 30, and the flag portion 16 are all made of micro-fiber and are manufactured as a single piece of material. In other embodiments, the medial longitudinal flap member 12, the first longitudinal flap member 14, and second longitudinal flap member 30 are manufactured as a single piece of material while the flag portion is subsequently connected (e.g., sown, stitched, tethered, adhered) thereto. In a further embodiment, the medial longitudinal flap member 12, the first longitudinal flap member 14, and second longitudinal flap member 30, and the flag portion 16 are manufactured as separate pieces and subsequently connected (e.g., sown, adhered) together. It should be appreciated that a variety of manufacturing combinations are also possible in light of the present disclosure.

Further, the deployable flag portion 16 may include an advertisement on the obverse and/or reverse surface of the deployable flag portion 16. The deployable flag bracelet 10 may therefore act as a marketing tool for different companies.

Finally, it should be appreciated, that the term 'coextensive' as used herein does not necessarily require the longitudinal length of the medial member 12, first member 14, second member 20, and flag portion 16 to be of the same length. In some embodiments, the medial member 12, first member 14, second member 30, and flag portion 16 are all of the same longitudinal length. In other embodiments, the medial member 12, first member 14, and second member 30 are all of the same longitudinal length, while the flag portion 16 is shorter in length and may resemble other shapes rather than a rectangle including a square shape, triangular shape, wavy shape, a specific shape for a companies logo, as well as other shapes know in the art. It should further be appreciated, that a 'longitudinal edge' as used herein does not necessarily refer to the outermost limit or border of the medial member 12, first member 14, second member 20, or flag portion 16, wherein in some embodiments the 'longitudinal edge' is the outermost limit or border, while in other embodiments the 'longitudinal edge' exists between the outermost limit or border and no farther than a transverse mid-point of the medial member 12, first member 14, second member 30, or flag portion 16.

OTHER EMBODIMENTS

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. A deployable flag bracelet comprising:
   a medial longitudinal flap member having a first longitudinal edge, an opposing longitudinal edge, a medial flap member obverse surface, and a medial flap member reverse surface;
   a first longitudinal flap member coextensive along the opposing longitudinal edge, said first longitudinal flap member having a first flap member obverse surface, and a first flap member reverse surface;
   a deployable flag portion coextensive along the first longitudinal edge, said flag portion rollable for storage when not in use by rolling the flag portion into contact overlying the medial flap member obverse surface, where the flag portion is thereat concealable beneath the first longitudinal flap member by folding the first longitudinal flap member on top of the flag portion such that the first flap member obverse surface makes contact with and conceals the rolled flag portion, wherein a transverse length of the first longitudinal flap member is of sufficient length to conceal the entirety of the rolled flag portion; and
   wherein said medial longitudinal flap member further has a first transverse edge and an opposing transverse edge for endwise attachment therebetween to form the bracelet wherein the deployable flag portion is maintainably concealed behind the first longitudinal flap member and wearable about a wrist of a user, whereby the user can deploy the flag portion to clean an optical surface by detaching the first transverse edge from the opposing transverse edge and unrolling the deployable flag portion.

2. The deployable flag bracelet of claim 1 further comprising a second longitudinal flap member situated between the medial longitudinal flap member and the deployable flag portion, said second longitudinal flap member having a second longitudinal edge wherein the second longitudinal flap member is coextensive along the first longitudinal edge, and the flag portion is coextensive along the second longitudinal edge, and wherein the flag portion is concealable beneath the first longitudinal flap member and the second longitudinal flap member.

3. The deployable flag bracelet of claim 1 wherein the first transverse edge and the opposing transverse edge are endwise attached with a fastener comprising at least one of a snap fastener, an adhesive, a button fastener, or a hook and loop.

4. The deployable flag bracelet of claim 3 wherein the fastener is a hook and loop.

5. The deployable flag bracelet of claim 1 further comprising a first end flap and a second end flap disposed upon the first transverse edge and the opposing transverse edge, respectively, to facilitate the endwise attachment to form the bracelet.

6. The deployable flag bracelet of claim 5 wherein the first end flap and the second end flap are endwise attached with a fastener comprising at least one of a snap fastener, an adhesive, a button fastener, or a hook and loop.

7. The deployable flag bracelet of claim 6 wherein the fastener comprises a first mating portion and a corresponding mating portion, wherein the first mating portion is disposed on an obverse surface of the first end flap and the corresponding mating portion is disposed on a reverse surface of the second end flap.

8. The deployable flag bracelet of claim 7 wherein the first mating portion is a hook and the corresponding mating portion is a loop.

9. The deployable flag bracelet of claim 1 wherein the deployable flag portion is made of micro-fiber.

10. The deployable flag bracelet of claim 1 wherein one or more surfaces of the deployable flag portion includes an advertisement.

* * * * *